(12) United States Patent
Sikka et al.

(10) Patent No.: US 11,498,776 B1
(45) Date of Patent: Nov. 15, 2022

(54) AUTOMATED GUIDED VEHICLE CONTROL AND ORGANIZING INVENTORY ITEMS USING DISSIMILARITY MODELS

(71) Applicant: Staples, Inc., Framingham, MA (US)

(72) Inventors: Sandeep Sikka, Natick, MA (US);
Nitin Verma, Natick, MA (US);
Michael Bhaskaran, Sherborn, MA (US)

(73) Assignee: Staples, Inc., Framingham, MA (US)

( * ) Notice: Subject to any disclaimer, the term of this patent is extended or adjusted under 35 U.S.C. 154(b) by 754 days.

(21) Appl. No.: 16/530,864

(22) Filed: Aug. 2, 2019

Related U.S. Application Data

(60) Provisional application No. 62/714,049, filed on Aug. 2, 2018.

(51) Int. Cl.
*B07C 5/342* (2006.01)
*B65G 47/90* (2006.01)
*G06N 5/04* (2006.01)

(52) U.S. Cl.
CPC ............ *B65G 47/905* (2013.01); *B07C 5/342* (2013.01); *G06N 5/048* (2013.01)

(58) Field of Classification Search
CPC ......... B65G 47/905; B07C 5/342; B07C 5/34; G06N 5/048; G06T 1/0014
USPC ........................................................ 700/223
See application file for complete search history.

(56) References Cited

U.S. PATENT DOCUMENTS

| | | | | |
|---|---|---|---|---|
| 5,134,291 A | * | 7/1992 | Ruhl, Jr. | ................. B07C 5/342 250/341.8 |
| 6,289,260 B1 | | 9/2001 | Bradley et al. | |
| 8,024,054 B2 | | 9/2011 | Mairs et al. | |
| 8,024,064 B1 | | 9/2011 | Sanghavi et al. | |
| 8,090,712 B2 | * | 1/2012 | Shellshear | .............. G06F 16/54 707/723 |

(Continued)

OTHER PUBLICATIONS

Chan, F., et al., Improving the productivity of order picking of a manual-pick and multi-level rack distribution warehouse through the implementation of class-based storage, Expert Systems with Applications. vol. 38, Issue Mar. 3, 2011, pp. 2686-2700.

(Continued)

*Primary Examiner* — Timothy R Waggoner
(74) *Attorney, Agent, or Firm* — VLP Law Group LLP; Michel Bohn

(57) ABSTRACT

In an embodiment, a method may determine a first candidate item type and a second candidate item type for a container. The method may determine appearance feature(s) of the first candidate item type and appearance feature(s) of the second candidate item type. The method may determine, using a trained dissimilarity model, a distinguishability score between the first candidate item type and the second candidate item type based on the appearance feature(s) of the first candidate item type and the appearance feature(s) of the second candidate item type. The method may determine to store the first candidate item type and the second candidate item type together in the container based on the distinguishability score between the first candidate item type and the second candidate item type. In some instances, the method may place item(s) of the first candidate item type and item(s) of the second candidate item type in the container.

20 Claims, 6 Drawing Sheets

(56) References Cited

U.S. PATENT DOCUMENTS

| | | |
|---|---|---|
| 8,965,562 B1 | 2/2015 | Wurman et al. |
| 9,111,251 B1 | 8/2015 | Brazeau |
| 9,120,622 B1 | 9/2015 | Elazary et al. |
| 9,452,883 B1 | 9/2016 | Wurman et al. |
| 9,965,730 B2 | 5/2018 | Hance et al. |
| 10,427,873 B1 | 10/2019 | Mause et al. |
| 10,504,055 B2 | 12/2019 | Hance et al. |
| 10,650,344 B2 | 5/2020 | Qin |
| 10,796,278 B1 | 10/2020 | Wintz et al. |
| 2002/0143669 A1 | 10/2002 | Scheer |
| 2007/0017984 A1 | 1/2007 | Mountz et al. |
| 2007/0094101 A1 | 4/2007 | Breitling |
| 2008/0071418 A1 | 3/2008 | Antony et al. |
| 2009/0082902 A1 | 3/2009 | Foltz et al. |
| 2009/0216364 A1 | 8/2009 | Grissom |
| 2013/0197869 A1 | 8/2013 | Fritz et al. |
| 2013/0226649 A1 | 8/2013 | Grissom |
| 2013/0338819 A1 | 12/2013 | Max |
| 2015/0161545 A1 | 6/2015 | Willemain et al. |
| 2015/0291356 A1 | 10/2015 | Oki et al. |
| 2015/0314331 A1* | 11/2015 | Thorsson ............... B07C 5/34 700/228 |
| 2016/0042314 A1 | 2/2016 | Mountz et al. |
| 2016/0060032 A1 | 3/2016 | Kim et al. |
| 2017/0091704 A1 | 3/2017 | Wolf et al. |
| 2017/0315918 A1 | 11/2017 | Nikitaki et al. |
| 2017/0330259 A1 | 11/2017 | Deshpande et al. |
| 2018/0005173 A1 | 1/2018 | Elazary et al. |
| 2018/0060764 A1 | 3/2018 | Hance et al. |
| 2018/0060765 A1 | 3/2018 | Hance et al. |
| 2018/0068255 A1 | 3/2018 | Hance et al. |
| 2018/0127211 A1 | 5/2018 | Jarvis et al. |
| 2018/0251300 A1 | 9/2018 | Kapuria et al. |
| 2018/0253680 A1 | 9/2018 | Jahani |
| 2019/0138978 A1 | 5/2019 | Johnson et al. |
| 2019/0259043 A1 | 8/2019 | Koneri et al. |
| 2019/0266552 A1 | 8/2019 | Gupta et al. |
| 2019/0272491 A1 | 9/2019 | Das et al. |
| 2019/0347607 A1 | 11/2019 | Shi et al. |
| 2019/0378232 A1 | 12/2019 | Goren et al. |

OTHER PUBLICATIONS

Egas, Carl and Masel, Dale, "Determining Warehouse Storage Location Assignments Using Clustering Analysis" (2010). 11th IMHRC Proceedings (Milwaukee, Wisconsin. USA-2010). (Year: 2010).

Hoshino et al. Highly efficient AGV transportation system management using agent cooperation and container storage planning, 2005 IEEE/RSJ International Conference on Intelligent Robots and Systems, Edmonton, Alta., 2005, pp. 1588-1593.

Kim, Byung Soo, et al., Slotting methodology using correlated improvement for a zone-based carton picking distribution system, Computers & Industrial Engineering, vol. 62, Issue 1, 2012, pp. 286-295. (Year: 2012).

Kovacs, A., Optimizing the storage assignment in a warehouse served by milkrun logistics, Int. J. Production Economics 133 (2011) 312-318. Available online Feb. 1, 2010.

Le-Duc et al. Travel distance estimation and storage zone optimization in a 2-block class-based storage strategy warehouse, pp. 3561-3581, Published online: Feb. 22, 2007.

Li, Yingde, et al., Dynamic Slotting Optimization Based on SKUs Correlations in a Zone-based Wave-picking System, 2012, 12th IMHRC Proceedings (Gardanne, France-2012.

Matthews, J. & Visagie, S. E. 2015. SKU assignment to unidirectional picking lines using correlations. Orion, 31(2):61-76, doi: 10.5784/31-2-531. (Year: 2015).

M. Kofler et al. "Re-warehousing vs. healing: Strategies for warehouse storage location assignment," 3rd IEEE International Symposium on Logistics and Industrial Informatics, 2011, pp. 77-82. (Year: 2011).

Wutthisirisart, Phichet. Relation-based item slotting. University of Missouri-Columbia, 2010. (Year: 2010).

Aljalbout, et al. Clustering with Deep Learning: Taxonomy and New Methods, Computer Vision Group, Technical Unviersity of Munich, Sep. 17, 2018, https://arxiv.org/pdf/1801.07648.pdf, 12 pages.

Bartholdi, III et al., Warehouse and Distribution Science. The Supply Chain and Logistics Institute , School of Industrial and Systems Engineering, Georgia Institute of Technology, Revised Aug. 19, 2014, https://www2.isye.gratech.edu/~jjb/wh/book/editions/wh-sci-0.96.pdf, 323 pgs.

Decisioncraft Inc., Warehouse Activity ProFiling and Order Picking Productivity, Issue No. 06/07/01, Accessed May 14, 2018, http://www.decisioncraft.com/dmdirect/warehouse_profiling.htm, 2 pages.

Egas, et al. Determining Warehouse Storage Location Assignments Using Clustering Analysis. Ohio University: Department of Industrial and Systems Engineering. (2010) pp. 1-7. https://digitalcommons.georgiasouthern.edu/pmhr_2010/19.

Han et al. Data mining : Concepts and techniques (3rd ed., Morgan Kaufmann series in data management systems), Burlington, Mass.: Elsevier. 2012 (pp. 487-568), Retreived from: https://www.scribd.com/document/339025636/Cluster-Analysis-pdf.

Park, et al., Algorithms for Generalized Cluster-wise Linear Regression. (May 17, 2016), https://arxiv.org/pdf/1607.01417.pdf, 29 pages.

Seward, Optimal Picer Routing; How Zalando Accelerates Warehouse Operations with Neural Networks, Slides. Dataconomy Media: Data and Analytics, Jan. 2016, https://www.slideshare.net/Dataconomy/how-zalando-accelerates-warehouse-operations-with-neural-networks-calvin-seward-data-scientist-at-zalando, 29 pgs.

Wikipedia, Loss Functions for Classification, Wikimedia Foundation, Apr. 25, 2018, https://en.wikipedia.org/wiki/Loss_functions_for_classification, 6 pages.

Yun et al., An Efficient Clustering Algorithm for Market Basket Data Based on Small Large Ratios. Department of Electrical Engineering, National Taiwan University, Proceedings: COMPSAC, the IEEE Computer Society's International Computer Software & Applications (Jan. 1, 2001), pp. 505-510. http://arbor.ee.ntu.edu.tw/~mschen/paperps/compsac150.pdf.

* cited by examiner

AUTOMATED GUIDED VEHICLE CONTROL AND ORGANIZING INVENTORY ITEMS USING DISSIMILARITY MODELS

BACKGROUND

This present disclosure relates to a technology for managing inventory items. For instance, the disclosure relates to managing inventory items stored in containers.

In storage facilities, human agents and/or computing devices often have a limited amount of time to recognize and pick items from containers to fulfill customer orders. This picking task often requires significant effort of the human agents or computational resources by computing devices to recognize the correct items to be picked from a container. To facilitate quick recognition of items by machine vision or even by human agents, different types of items are typically stored in separate containers or partitions thereof, and thus these solutions are inefficient at fully utilizing the storage space of the container. In addition, storing the items of one item type in the same compartment may cause unbalanced weight distribution within the container, thereby causing the instability of the container during its transportation.

SUMMARY

According to one innovative aspect of the subject matter described in this disclosure, a method comprises: determining a first candidate item type and a second candidate item type for a container; determining one or more appearance features of the first candidate item type and one or more appearance features of the second candidate item type; determining, using a trained dissimilarity model, a distinguishability score between the first candidate item type and the second candidate item type based on the one or more appearance features of the first candidate item type and the one or more appearance features of the second candidate item type; determining to store the first candidate item type and the second candidate item type together in the container based on the distinguishability score between the first candidate item type and the second candidate item type; and placing one or more items of the first candidate item type and one or more items of the second candidate item type in the container.

In general, another innovative aspect of the subject matter described in this disclosure may be embodied in methods comprising: training a dissimilarity model using one or more item images of one or more item types; determining, from the one or more item types, a first candidate item type and a second candidate item type for a container; determining one or more appearance features of the first candidate item type and one or more appearance features of the second candidate item type; determining, using the trained dissimilarity model, a distinguishability score between the first candidate item type and the second candidate item type based on the one or more appearance features of the first candidate item type and the one or more appearance features of the second candidate item type; determining to store the first candidate item type and the second candidate item type together in the container based on the distinguishability score between the first candidate item type and the second candidate item type; and instructing a robotic device to place one or more items of the first candidate item type and one or more items of the second candidate item type in the container.

In general, another innovative aspect of the subject matter described in this disclosure may be embodied in a system that includes one or more processors and one or more memories storing instructions that, when executed by the one or more processors, cause the system to: determine a first candidate item type and a second candidate item type for a container; determine one or more appearance features of the first candidate item type and one or more appearance features of the second candidate item type; determine, using a trained dissimilarity model, a distinguishability score between the first candidate item type and the second candidate item type based on the one or more appearance features of the first candidate item type and the one or more appearance features of the second candidate item type; determine to store the first candidate item type and the second candidate item type together in the container based on the distinguishability score between the first candidate item type and the second candidate item type; and place one or more items of the first candidate item type and one or more items of the second candidate item type in the container.

These and other embodiments may optionally include one or more of the following features, such as: that placing the one or more items of the first candidate item type and the one or more items of the second candidate item type in the container includes placing the one or more items of the first candidate item type and the one or more items of the second candidate item type in a same compartment of the container; that determining the first candidate item type and the second candidate item type for the container includes determining an item affinity between the first candidate item type and the second candidate item type based on a number of orders including the first candidate item type and the second candidate item type, and determining that the item affinity between the first candidate item type and the second candidate item type satisfies an item affinity threshold; training the dissimilarity model using one or more item images of a first item type and one or more item images of a second item type; that training the dissimilarity model includes generating a synthesized image using the one or more item images of the first item type and the one or more item images of the second item type, detecting, using an object detection model, one or more items in the synthesized image, computing a detection accuracy score associated with the synthesized image, determining a first appearance feature associated with a feature type of the first item type and a second appearance feature associated with the feature type of the second item type, and adjusting one or more model parameters of the dissimilarity model based on the first appearance feature of the first item type, the second appearance feature of the second item type, and the detection accuracy score associated with the synthesized image;

These and other embodiments may additionally or alternatively include one or more of the following features, such as: that the first appearance feature of the first item type describes a visually distinguishable aspect of the first item type, the first appearance feature specifying the feature type and a value of the feature type associated with the first item type, and the feature type includes one or more of a color, a geometric shape, a dimension, and a packaging material; that adjusting the one or more model parameters of the dissimilarity model includes adjusting a dissimilarity metric between the first appearance feature and the second appearance feature in the dissimilarity model based on the detection accuracy score associated with the synthesized image, and adjusting a discrimination weight of the feature type associated with the first appearance feature and the second appearance feature in the dissimilarity model based on the detection accuracy score associated with the synthesized image; that generating the synthesized image includes retrieving a clutter image depicting a clutter structure, and generating the synthesized image using the one or more item images of the first item type, the one or more item images of the second item type, and the clutter image, the synthesized image depicting one or more items of the first item type and one or more items of the second item type positioned based on the clutter structure; that computing the detection accuracy score associated with the synthesized image includes determining a target detection result associated with the synthesized image, and computing the detection accuracy score associated with the synthesized image based on a detection result of the synthesized image generated by the object detection model and the target detection result of the synthesized image; that the object detection model has an algorithm complexity metric satisfying an algorithm complexity metric threshold.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology presented in this disclosure improves upon the existing approaches and is advantageous in a number of respects. For example, the technology described herein is capable of objectively determining types of items that satisfy a threshold appearance dissimilarity to be stored in the same container, thereby allowing human agents and/or computer vision to more easily distinguish these item types from one another to correctly pick the requested items from the container without using significant time and effort, thereby improving efficiency and picking accuracy. Implementation may also eliminate the need to divide the container (e.g., storage box, tote, mini-pallet, etc.) into multiple compartments (e.g., storage bins) and separately store inventory items of one item type in one compartment, so the containers may include a single compartment and commonly store various item types therein. As a result, the number of item types stored in the same container may not be limited by the number of compartments, and the container can store a large number of item types to fulfill different orders. Additionally, because multiple items of various item types may be stored together in one compartment of the container, the balance of the container during transportation can also be improved (e.g., because item types having different weights are not stored in different partitions of the container). The technology described herein can decrease the unutilized storage space of a container caused by using multiple compartments for storage, while reducing the processing resources or cognitive burden spent to recognize and correctly pick the requested items from the container.

Figure 1:
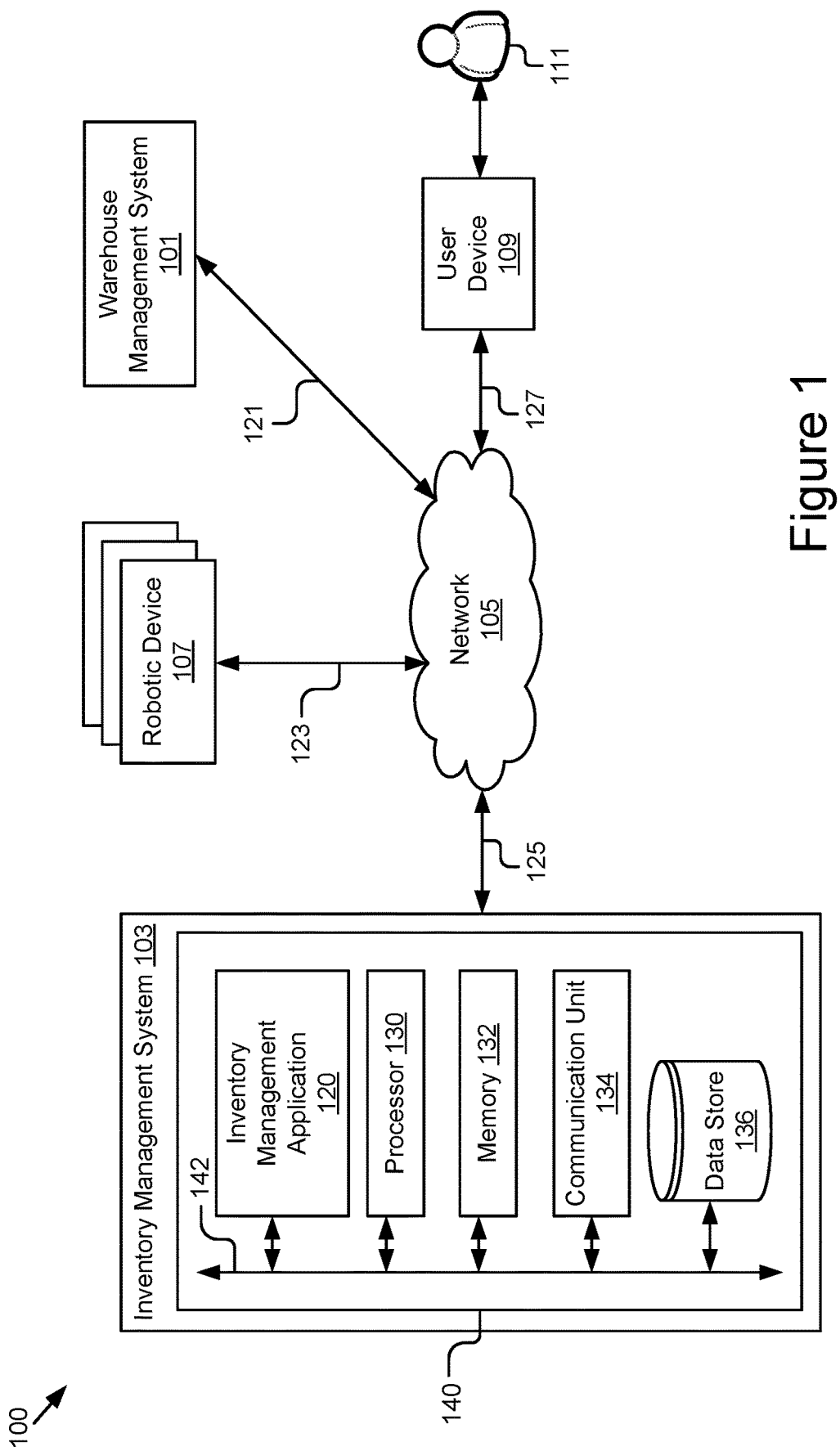
FIG. 1 is a block diagram of an example system for managing item types stored in a container.

FIG. 1 is a block diagram of an example system 100 for managing item types stored in containers. As illustrated, the system 100 includes a warehouse management system 101, an inventory management system 103, one or more robotic devices 107, and a user device 109 coupled for electronic communication via a network 105. As shown, the user device 109 may interact with a user 111 (e.g., a human agent in the storage facility). In FIG. 1 and the remaining figures, a letter after a reference number, e.g., "310*a*," may represent a reference to the element having that particular reference number. A reference number in the text without a following letter, e.g., "310," may represent a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of warehouse management systems 101, inventory management systems 103, networks 105, robotic devices 107, user devices 109, or users 111.

The network 105 may be a conventional type, wired and/or wireless, and may have numerous different configurations including a star configuration, token ring configuration, or other configurations. Furthermore, the network 105 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, or other suitable networks. Although FIG. 1 illustrates a single block for the network 105 that couples to the warehouse management system 101, the inventory management system 103, the robotic devices 107, and the user device 109, it should be understood that the network 105 may in practice comprise any number of combination of networks, as noted above.

The warehouse management system (WMS) 101 can manage a variety of tasks to support and/or control operations of a storage facility. In some embodiments, the WMS 101 may include a hardware and/or virtual server that includes a processor, a memory, and network communication capabilities (e.g., a communication unit). The WMS 101 may be communicatively coupled to the network 105, as reflected by signal line 121. In some embodiments, the WMS 101 may send and receive data to and from other components of the system 100 (e.g., the inventory management system 103, the robotic devices 107, the user devices 109, other servers, etc.). As an example, the WMS 101 may keep track of the inventory level of an item type, and send a purchase order to a vendor server when the inventory level of the item type is low. In another example, the WMS 101 may receive customer orders assigned to the storage facility, process the customer orders, and send the customer orders to the inventory management system 103 to manage the order fulfillment.

The robotic device 107 may include a robotic platform operating in the storage facility. In some embodiments, the robotic device 107 may include a processor, a memory, and network communication capabilities (e.g., a communication unit). The robotic device 107 may be communicatively coupled to the network 105, as reflected by signal line 123. In some embodiments, the robotic device 107 may send and receive data to and from other entities of the system 100 (e.g., the WMS 101, the inventory management system 103, other robotic devices 107, etc.). In some embodiments, the robotic device 107 may include a container handling mechanism (e.g., a robotic arm) adapted to autonomously place inventory items into a container and/or pick items from the container. In some embodiments, the robotic device 107 may be an automated guided vehicle (AGV) that is capable of moving from one point to another, transporting objects (e.g., containers, shelving units, etc.), placing containers at the picking station, and/or returning containers to the shelves in the storage aisles, etc. In some embodiments, the robotic device 107 may include one or more optical sensors that sense an environment of the robotic device 107. For instance, an optical sensor coupled with the robotic device may capture a still image or video of a container, which a processor of the robotic device 107, or of another entity that is communicatively coupled with the robotic device 107, may use to recognize items based on their visual characteristics or appearance features, as described herein. It should be understood that the robotic devices may perform other tasks in the storage facility. Other types of robotic devices are also possible and contemplated.

The user device 109 may be a computing device that includes a processor, a memory, and network communication capabilities (e.g., a communication unit). The user device 109 may be coupled to the network 105, as reflected by signal line 127. In some embodiments, the user device 109 may send and receive data to and from other entities of the system 100 (e.g., the WMS 101, the inventory management system 103, other robotic devices 107, etc.). Non-limiting examples of the user device 109 include, but are not limited to, a desktop computer, laptop computer, holographic computer, tablet, mobile phone, personal digital assistant (PDA), etc. In some embodiments, the user device 109 may receive user input from the user 111 and/or display various data to the user 111. As an example, the user device 109 may display a set of distinguishable item types associated with a container to the user 111, and the user 111 may place one or more items belonging to the item types in the set of distinguishable item types into the container accordingly and/or may pick one or more items belonging to an item type from the container.

The inventory management system 103 may manage the inventory items in the storage facility. For example, the inventory management system 103 may manage the replenishment of the item types, the placement of various item types into a container or partition thereof, the placement of containers in the storage areas of the storage facility (e.g., high-velocity picking area, high-density storage area, etc.), etc. The inventory management system 103 may be communicatively coupled to the network 105, as reflected by signal line 125. In some embodiments, the inventory management system 103 may send and receive data to and from other components of the system 100 (e.g., the WMS 101, the robotic devices 107, the user devices 109, etc.).

As depicted in FIG. 1, the inventory management system 103 may include a computing device 140 (e.g., a hardware and/or virtual server). The computing device 140 may include a processor 130, a memory 132, a communication unit 134, a data store 136, and an inventory management application 120 communicatively coupled by a bus 142. The computing device 140 illustrated in FIG. 1 is provided by way of example and it should be understood that the computing device 140 may take other forms and include additional or fewer components without departing from the scope of the present disclosure. For example, various components of the computing device 140 may be coupled for communication using a variety of communication protocols and/or technologies including, for example, communication buses, software communication mechanisms, computer networks, etc. While not shown, the computing device 140 may include various operating systems, sensors, additional processors, and other physical configurations. Although FIG. 1 only illustrates a single process 130, memory 132, data store 136, etc., it should be understood that the computing device 140 may include other quantities or configurations of one or more of these components.

The processor 130 may execute software instructions by performing various input, logical, and/or mathematical operations. The processor 130 may have various computing architectures to method data signals including, for example, a complex instruction set computer (CISC) architecture, a reduced instruction set computer (RISC) architecture, and/or an architecture implementing a combination of instruction sets. The processor 130, which may include one or more physical or virtual processors, may include a single core or plurality of processing units and/or cores. In some embodiments, the processor 130 may be capable of generating and providing electronic signals to other computing entities (e.g., the WMS 101, the robotic devices 107, the user devices 109, etc.), and performing complex tasks such as image processing, feature extraction, etc. In some embodiments, the processor 130 may be coupled to the memory 132 via the bus 142 to access data and instructions therefrom and store data therein. The bus 142 may couple the processor 130 to the other components of the computing device 140 including, for example, the inventory management application 120, the memory 132, the communication unit 134, and/or the data store 136.

The memory 132 may store and provide access to data to the other components of the computing device 140. The memory 132 may be included in a single computing device or a plurality of computing devices. In some embodiments, the memory 132 may store instructions and/or data that may be executed by the processor 130. For example, the memory 132 may store computer logic executed by the inventory management application 120, depending on the configuration. The memory 132 is also capable of storing other instructions and data, including, for example, an operating system, hardware drivers, software applications, databases, etc. The memory 132 may be coupled to the bus 142 for communication with the processor 130 and other components of computing device 140. The memory 132 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 130. In some embodiments, the memory 132 may include one or more of volatile memory and non-volatile memory (e.g., RAM, ROM, hard disk, optical disk, etc.). It should be understood that the memory 132 may be a single device or may include multiple types of devices and configurations.

The bus 142 may include a communication bus for transferring data between components of a computing device or between computing devices, a network bus system including a network or portions thereof, a processor mesh, a combination thereof, etc. In some embodiments, the server, the inventory management application 120, and various other components operating on the computing device 140 (operating systems, device drivers, etc.) may cooperate and communicate via a communication mechanism included in or implemented in association with the bus 142. The software communication mechanism may include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 134 may include one or more interface devices (I/F) for wired and wireless connectivity among the computing entities of the system (e.g., the server, the robotic devices, etc.). For example, the communication unit 134 may include, but is not limited to, various types known connectivity and interface options. The communication unit 134 may be coupled to other components of the computing device 140 via the bus 142. The communication unit 134 may be coupled to a network (e.g., the Internet, an intranet, etc.), depending on the configuration. In some embodiments, the communication unit 134 may link the processor 130 to the network, which may in turn be coupled to other processing systems. The communication unit 134 may provide other connections to a network, servers, and/or computing devices using various standard communication protocols.

The data store 136 may include a non-transitory storage medium that stores various types of data and provides access to the data. The data stored by the data store 136 may be organized and queried using various criteria. For example, the data store 136 may include data tables, databases, or other organized collections of data. In some embodiments, the data store 136 may be included in the computing device 140 or in another computing system and/or storage system distinct from but coupled to or accessible by the computing device 140. In some embodiments, the data store 136 may be incorporated with the memory 132 or may be distinct therefrom. In some embodiments, the data store 136 may store data associated with a database management system (DBMS) operable on the computing device 140. For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 136 may include, but is not limited to, item data, image data, appearance data, feature data, model data, etc. In some embodiments, the data store 136 may store the item data describing the item type. An item type may represent a particular type of item in the storage facility and may be uniquely identified by an item type identifier (e.g., Stock Keeping Unit—SKU). For instance, a type of item may include a class, brand, category, style, etc., of items (e.g., pens vs pencils, mouse pads vs staplers, etc.). Non-limiting examples of the item data include, but are not limited to, the item type identifier, the item velocity indicating the number of orders including the item type during a time period (e.g., 480 orders/70 days), the item affinity between the item type and other item types (e.g., co-occurrence of the items in orders, similarity, etc.), the appearance features describing the appearance of the item type (e.g., "color: blue," "geometric shape: rectangle," size, etc.), etc. In some embodiments, the data store 136 may store image data including item images of one or more item types, clutter images depicting a clutter structure in which items may be positioned, etc., as described elsewhere herein. In some embodiments, the data store 136 may store model data including one or more model parameters of a dissimilarity model (e.g., dissimilarity metrics between corresponding appearance features, discrimination weights of the feature types, etc.). Other types of data are also possible and contemplated.

The inventory management application 120 may include computer logic executable by the processor 130 for managing item types stored in containers. In some embodiments, the inventory management application 120 may be implemented in the inventory management system 103, the WMS 101, the robotic devices 107, and/or the user devices 109. In some embodiments, the inventory management application 120 may be implemented using software executable by one or more processors of one or more computer devices, using hardware, such as, but not limited to, a field-programmable gate array (FPGA), an application-specific integrated circuit (ASIC), etc., and/or a combination of hardware and software, etc. In some embodiments, the inventory management application 120 may communicate with other components of the computing device 140 via the bus 142 and/or the processor 130, and communicate with other entities of the system via the network. In some embodiments, the inventory management application 120 may be a set of instructions executable by the processor 130 to provide its functionality. In further embodiments, the inventory management application 120 may be storable in the memory 132 and accessible and executable by the processor 130 to provide its functionality. In any of the foregoing embodiments, the inventory management application 120 may be adapted for cooperation and communication with the processor 130 and other components of the computing device 140.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
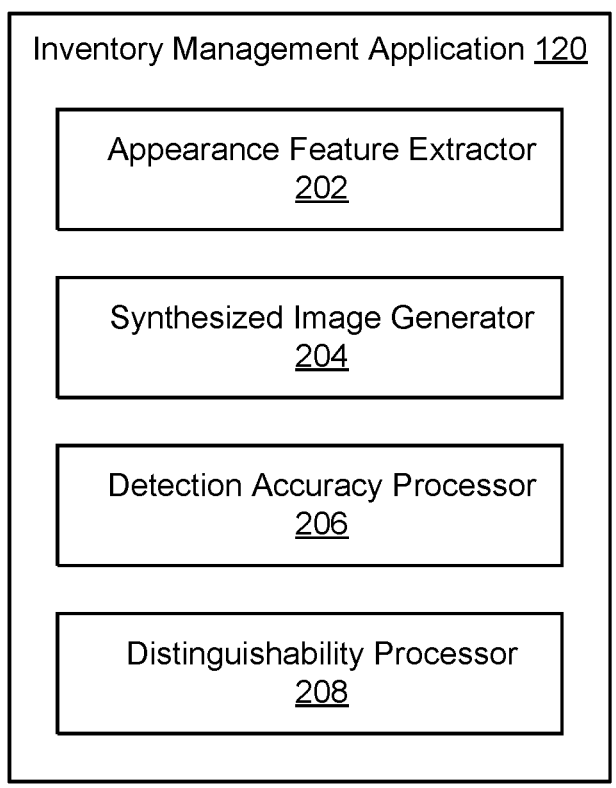
FIG. 2 is a block diagram of an example inventory managing application.

FIG. 2 is a block diagram of an example inventory management application 120. As depicted, the inventory management application 120 may include an appearance feature extractor 202, a synthesized image generator 204, a detection accuracy processor 206, and a distinguishability processor 208. It should be understood that the inventory management application 120 may include additional components (e.g., a configuration engine, an encryption/decryption engine, etc.) and that these various components may be combined into a single engine or divided into additional engines.

The appearance feature extractor 202, the synthesized image generator 204, the detection accuracy processor 206, and the distinguishability processor 208 may be implemented as software, hardware, or a combination of the foregoing. In some embodiments, the appearance feature extractor 202, the synthesized image generator 204, the detection accuracy processor 206, and the distinguishability processor 208 may be communicatively coupled by the bus 142 and/or the processor 130 to one another and/or to the other components of the computing device 140. In some embodiments, one or more of the components 202, 204, 206, and/or 208 are sets of instructions executable by the processor 130 to provide their functionality. In further embodiments, one or more of the components 202, 204, 206, and/or 208 are storable in the memory 132 and are accessible and executable by the processor 130 to provide their functionality. In any of the foregoing embodiments, these components 202, 204, 206, and/or 208 may be adapted for cooperation and communication with the processor 130 and other components of the computing device 140. The inventory management application 120 and its components 202, 204, 206, 208 are described in further detail below with reference to at least FIGS. 3-7.

In some embodiments, to manage the item types stored in the containers, the inventory management application 120 may implement a dissimilarity model and determine item types that satisfy a threshold appearance dissimilarity using the dissimilarity model. The inventory management application 120 may then instruct the robotic device 107 and/or the user 111 to place the inventory items of these item types into the same container. In some embodiments, the dissimilarity model implemented by the inventory management application 120 may be subjected to a training process before it is deployed to evaluate the appearance dissimilarity between one or more item types, as described in further detail below.

Figure 3:
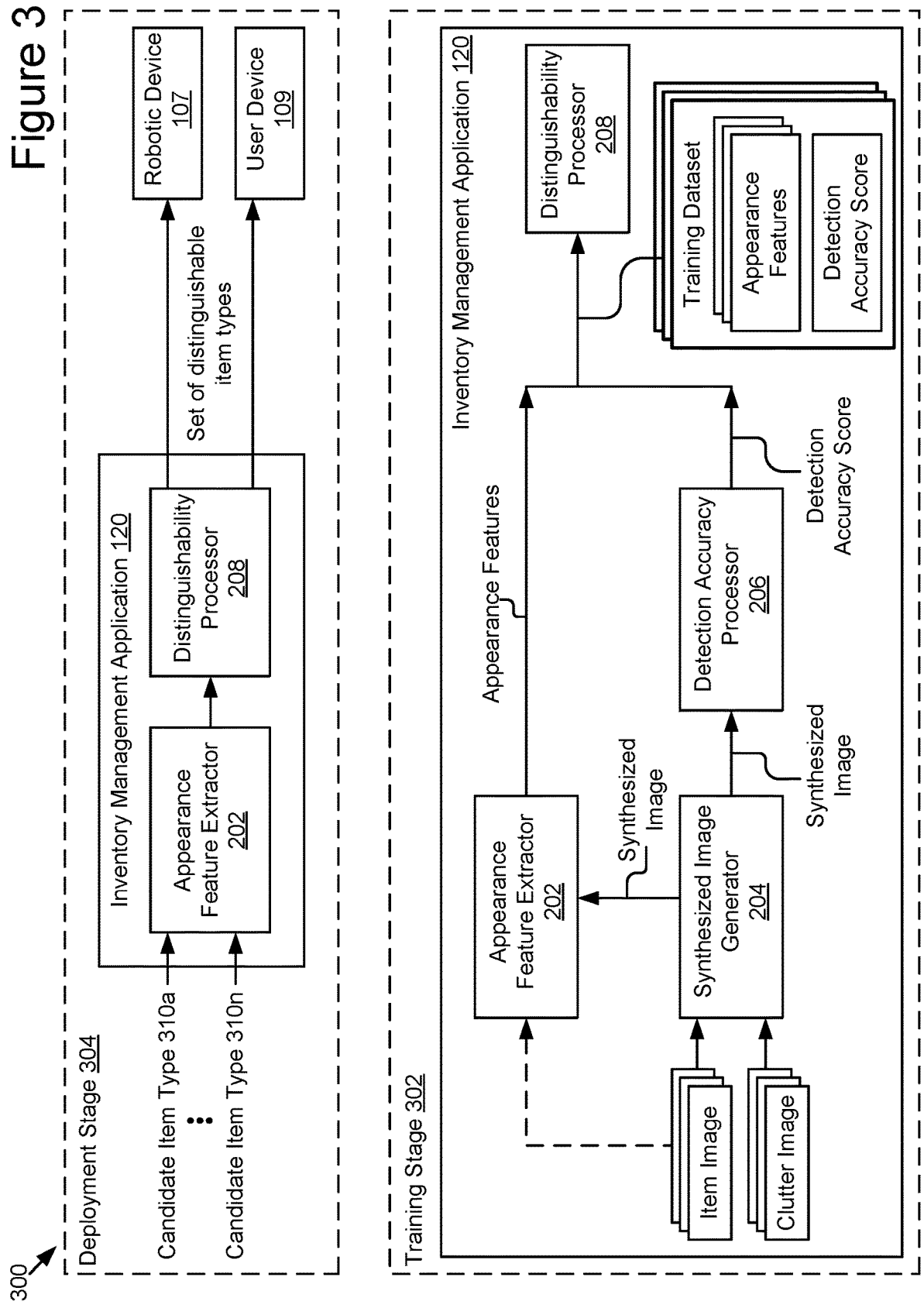
FIG. 3 illustrates a training stage and an implementation stage of a dissimilarity model.

FIG. 3 illustrates a block diagram 300 of an example training stage 302 and an example deployment stage 304 of the dissimilarity model implemented by the inventory management application 120. As depicted, in the training stage 302, the synthesized image generator 204 may generate the synthesized images from the item images of one or more item types (e.g., images of individual items or their packaging) and clutter images. For example, as described below, a clutter image includes placeholder objects arranged according to a defined structure, which may be random, organized according to a defined pattern, etc. The clutter image illustrates items (e.g., images of items) placed together, for example, in a container; and the clutter structure of the clutter image is an estimated arrangement of how those items may be organized in the container.

The synthesized image may illustrate a break-pack clutter (e.g., a group of packages of items) and may be referred to as an occluded image. In some embodiments, the detection accuracy processor 206 may apply an object detection model to the synthesized image and determine a detection accuracy score associated with the synthesized image. The appearance feature extractor 202 may analyze the synthesized image, and/or the item images of the item types included in the synthesized image, and extract the appearance features of these item types, although other embodiments are possible. In some embodiments, the inventory management application 120 may generate one or more training datasets. For example, the appearance feature extractor 202 and/or the detection accuracy processor 206 may aggregate the appearance features of the item types in the synthesized image and the detection accuracy score of the synthesized image to generate a training dataset associated with the synthesized image. In some embodiments, the training datasets may be used to train the distinguishability processor 208. The distinguishability processor 208 may learn to objectively evaluate the distinguishability of the appearance between item types based on their appearance features using these training datasets.

In some embodiments, once the training process is complete, the components of the inventory management application 120 may perform their corresponding functionalities to determine whether item types satisfy a threshold appearance dissimilarity to be stored together in the same container. As depicted in FIG. 3, in the deployment stage 304, the inventory management application 120 may determine one or more candidate item types 310 for a given container. For example, the inventory management application 120 may determine the candidate item types 310a . . . 310n for the container based on a correlation of the demand between these candidate item types 310. In some embodiments, the appearance feature extractor 202 may determine the appearance features (e.g., features of a visual appearance) of candidate item types 310. For example, the appearance feature extractor 202 may extract the appearance features of the candidate item types 310 from their item images, although appearance features may be extracted from a data file associated with the item types, etc. The distinguishability processor 208 may apply the trained dissimilarity model to determine the dissimilarities between corresponding appearance features of the candidate item types 310, evaluate the distinguishability of the candidate item types 310, and determine whether these candidate item types 310 are suitable to be stored together in the same container or partition thereof.

The distinguishability processor 208 may determine a set of distinguishable item types from the candidate item types 310. The set of distinguishable item types may include the candidate item types 310 that have the appearance dissimilarity between one another satisfying the threshold appearance dissimilarity, and thus these candidate item types 310 can be distinguished from one another without requiring a computing device (e.g., the robotic device 107) or human agent to perform complicated recognition and discrimination tasks. In some embodiments, the inventory management application 120 may transmit the set of distinguishable item types to the robotic device 107 and/or the user device 109. The robotic device 107 and/or the user 111 of the user device 109 may place the inventory items of the item types in the set of distinguishable item types into the same container. In some embodiments, the inventory management application 120 may use the set of distinguishable item types to augment and/or optimize the training datasets. Examples operations for the training stage 302 are described in further detail below, for example, in reference to FIG. 5.

Figure 5:
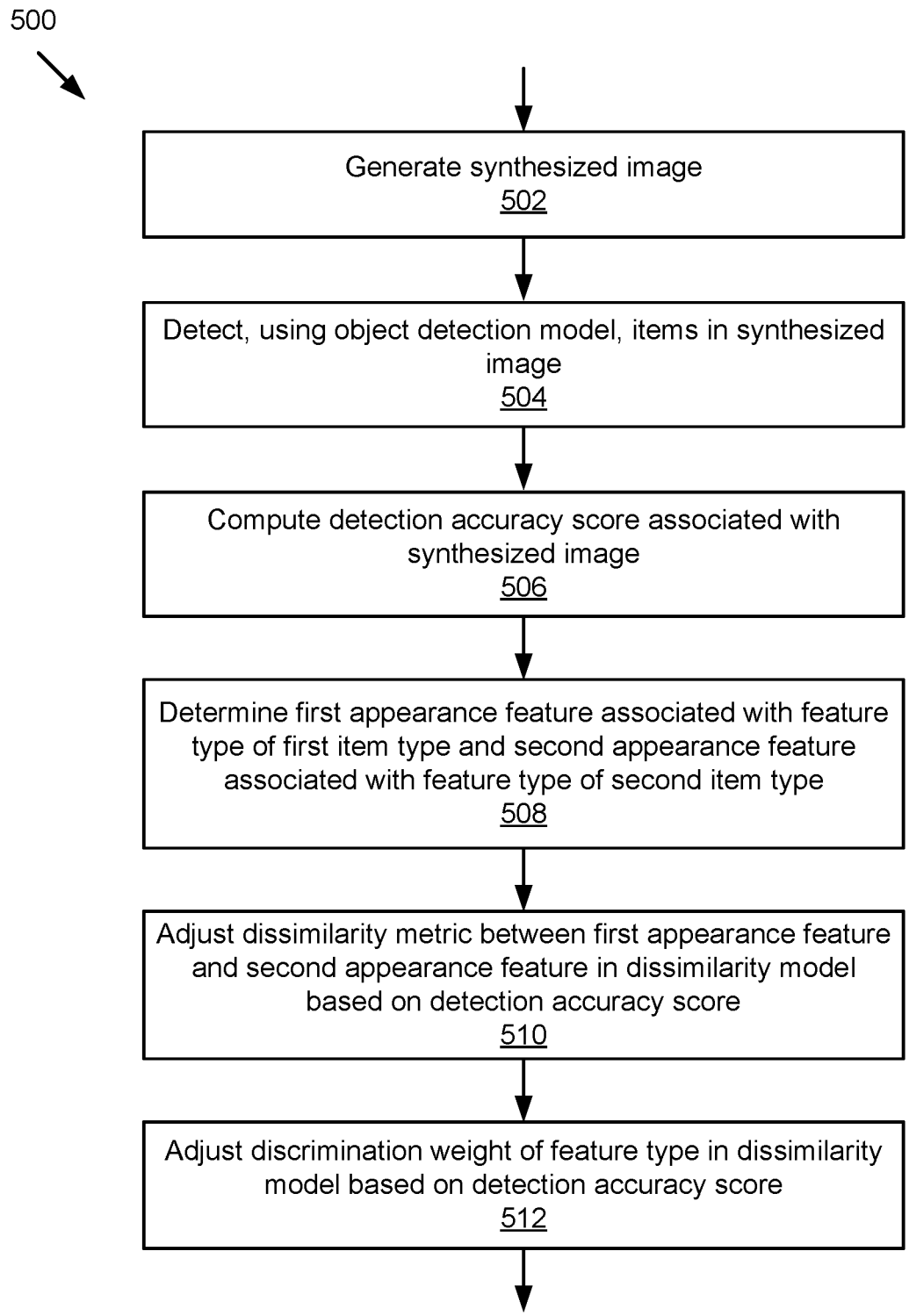
FIG. 5 is a flowchart of an example method for training the dissimilarity model.

FIG. 5 illustrates an example method 500 for training the dissimilarity model using one or more item images of various item types in the storage facility. In some embodiments, the dissimilarity model may include various model parameters, which the inventory management application 120 may use to evaluate the dissimilarities between the appearance features of the item types and evaluate the appearance distinguishability between these item types. As discussed elsewhere herein, the item type may refer to a type of item in the storage facility that can be uniquely identified by an item identifier (e.g., SKU).

In block 502, the synthesized image generator 204 may generate a synthesized image using one or more item images of a first item type and one or more item images of a second item type.

Figure 6:
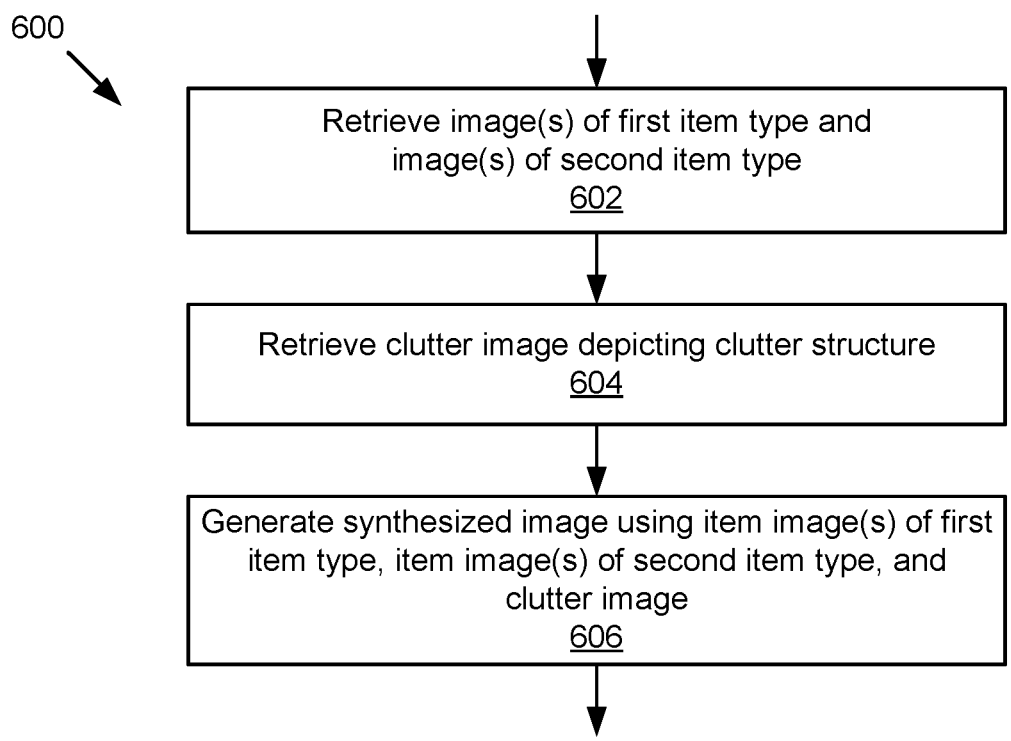
FIG. 6 is a flowchart of an example method for generating a synthesized image.

An example method 600 for generating the synthesized image is illustrated in FIG. 6. In block 602, the synthesized image generator 204 may retrieve one or more item images of the first item type and one or more item images of the second item type from the data store 136. The item image of the first item type may be a catalog image, image of packaging of individual items, consumer image, etc., that depicts one or more items of the first item type. In some embodiments, the items of the first item type in these item images may be captured from different perspectives (e.g., different viewing angles), in different lighting conditions, with different image resolutions, etc. Similarly, the item images of the second item type may illustrate one or more items of the second item type captured from different perspectives, in different lighting conditions, with different image resolutions, etc. In block 604, the synthesized image generator 204 may retrieve a clutter image from the data store 136. The clutter image may depict a clutter structure describing an object arrangement in which one or more items of one or more item types may be positioned. For instance, items may be positioned according to the clutter structure in a neatly organized manner and/or a randomly disorganized manner.

In block 606, the synthesized image generator 204 may generate a synthesized image using image(s) of the first item type, the image(s) of the second item type, and the clutter image. In some embodiments, the synthesized image generator 204 may extract one or more image regions depicting portions of items from the item images of the first item type, and extract one or more image regions depicting portions of items from the item images of the second item type. The synthesized image generator 204 may then map the image regions of these item images to the clutter image to generate the synthesized image. Thus, the synthesized image may depict an item of the first item type and an item of the second item type positioned based on the clutter structure. It should be understood that the synthesized image may depict any number of item types and/or any number of items belonging to an item type.

In some embodiments, as the synthesized image is generated, the synthesized image generator 204 may determine a target detection result associated with the synthesized image. The target detection result may describe a ground truth associated with the synthesized image, and may indicate the item type(s) and the number of item(s) or packing unit(s) belonging to each item type depicted in the synthesized image. As an example, the target detection result of a first synthesized image may indicate that the first synthesized image depicts 5 reams of copy paper ABC (e.g., SKU "PA3301"), 3 boxes of pen DEF (e.g., SKU "PE1103"), and 4 boxes of pencil GHI (e.g., SKU "EA8795").

Referring back to FIG. 5, in block 504, the detection accuracy processor 206 may detect one or more items in the synthesized image using an object detection model. In some embodiments, the detection accuracy processor 206 may apply the object detection model to the synthesized image to detect one or more items in the synthesized image and generate a detection result for the synthesized image. The detection result of the synthesized image may indicate the item type(s) and/or the item(s)/item package(s) belonging to each item type in the synthesized image that are detected by the object detection model. Continuing the above example regarding the first synthesized image, the object detection model may analyze the first synthesized image, and determine that the first synthesized image depicts 5 reams of copy paper ABC and 6 boxes of pen DEF.

In some embodiments, the object detection model may have an algorithm complexity metric satisfying an algorithm complexity metric threshold (e.g., less than 25%). The algorithm complexity metric may indicate the level of complexity of the object detection model, and may reflect the workload of recognizing and distinguishing between item types to come up with the same detection result as the object detection model. For instance, an object detection model that has a relatively low algorithm complexity metric as compared to other object detection models may illustrate the context in which the recognition and discrimination tasks are relatively clear and uncomplicated.

In block 506, the detection accuracy processor 206 may compute a detection accuracy score associated with the synthesized image based on the detection result of the synthesized image generated by the object detection model and the target detection result of the synthesized image. In some embodiments, the detection accuracy processor 206 may compare the detection result of the synthesized image to the target detection result of the synthesized image, and determine the detection accuracy score of the synthesized image based on the number of item types and/or the number of items/packages belonging to each item type that are correctly identified by the object detection model. In the above example regarding the first synthesized image, the detection accuracy processor 206 may determine that the detection accuracy score for the first synthesized image is, for instance, 40%. Other implementations for determining the detection accuracy score of the synthesized image are also possible and contemplated.

In block 508, the appearance feature extractor 202 may determine a first appearance feature associated with a feature type of the first item type and a second appearance feature associated with the same feature type of the second item type. The first appearance feature of the first item type and the second appearance feature of the second item type that are associated with the same feature type may be referred to herein as the corresponding appearance features of the first item type and the second item type for the feature type. In some embodiments, the feature type may be an appearance aspect or visually distinguishable aspect describing the item or the packing unit (also referred to as a package of the item(s)) of the item type. For instance, the packing unit may include one or more items of the item type (e.g., box of pens, pack of sticky notes, etc.). Non-limiting examples of the feature type include, but are not limited to, color (e.g., red, blue, etc.), geometric shape (e.g., rectangle, square, cylinder, pyramid, etc.), dimension (e.g., length, width, height, diameter, etc.), packaging material (e.g., carton, clamshell, bag, etc.), although other feature types are also possible and contemplated.

In some embodiments, for an item type included in the synthesized image, the appearance feature extractor 202 may analyze the item images of the item type and/or the synthesized image, and determine the appearance features associated with various feature types for the item type. In some embodiments, an appearance feature of the item type may describe an aspect of the appearance of the item type. For example, the appearance feature may specify a feature type (e.g., size, color, etc.) and a value of the feature type that describes the item/packing unit of the item type. In the above example regarding the first synthesized image, the appearance feature extractor 202 may determine that the appearance features of the item type "pen DEF" are "color: red," "geometric shape: rectangle," "dimension: length=15 cm, width=7 cm, height=3 cm," "packaging material: carton," etc. In this example, the appearance feature extractor 202 may also determine that the appearance features of the item type "pencil GHI" are "color: orange," "geometric shape: rectangle," "dimension: length=12 cm, width=9 cm, height=3 cm," "packaging material: carton," etc. In some embodiments, the appearance feature extractor 202 may additionally or alternatively retrieve the appearance features associated with various feature types for the item type from the data store 136.

In some embodiments, the appearance feature extractor 202 and/or the detection accuracy processor 206 may generate a training dataset associated with the synthesized image. In some embodiments, the appearance feature extractor 202 and/or the detection accuracy processor 206 may aggregate into the training dataset the appearance features of the item types in the synthesized image that are determined by the appearance feature extractor 202, and the detection accuracy score of the synthesized image that is computed by the detection accuracy processor 206 as discussed above. The distinguishability processor 208 may then use the training dataset associated with the synthesized image as a training sample to train the dissimilarity model during the training stage 302.

In some embodiments, to train the dissimilarity model in a training cycle using the training dataset associated with the synthesized image, the distinguishability processor 208 may determine one or more pairs of item types in the synthesized image. For a pair of item types including the first item type and the second item type in the synthesized image, the distinguishability processor 208 may extract the corresponding appearance features of the first item type and the second item type from the training dataset. For example, the distinguishability processor 208 may extract from the training dataset the first appearance feature of the first item type and the second appearance feature of the second item type that are associated with the same feature type (e.g., feature type "color"). The distinguishability processor 208 may also extract from the training dataset the detection accuracy score of the synthesized image. The distinguishability processor 208 may then adjust one or more model parameters of the dissimilarity model based on the first appearance feature of the first item type, the second appearance feature of the second item type, and the detection accuracy score associated with the synthesized image.

In block 510, the distinguishability processor 208 may adjust the dissimilarity metric between the first appearance feature of the first item type and the second appearance feature of the second item type in the dissimilarity model based on the detection accuracy score of the synthesized image. In some embodiments, the distinguishability processor 208 may determine whether the detection accuracy score of the synthesized image satisfies a first detection accuracy score threshold (e.g., higher than 75%) or a second detection accuracy score threshold (e.g., lower than 45%). If the detection accuracy score of the synthesized image satisfies the first detection accuracy score threshold or the second detection accuracy score threshold, the distinguishability processor 208 may respectively increase or decrease the dissimilarity metric between the first appearance feature of the first item type and the second appearance feature of the second item type in the dissimilarity model by an offset value proportional to the detection accuracy score of the synthesized image. Other implementations for adjusting the dissimilarity metric between the corresponding appearance features in the dissimilarity model are also possible and contemplated.

Continuing the above example regarding the first synthesized image, the distinguishability processor 208 may determine a pair of item types including the first item type "pen DEF" and the second item type "pencil GHI." For this pair of item types, the distinguishability processor 208 may determine that the first appearance feature associated with the feature type "color" of the pen DEF is "color: red" and the second appearance feature associated with the same feature type "color" of the pencil GHI is "color: orange." The distinguishability processor 208 may then adjust the dissimilarity metric between the first appearance feature (e.g., "color: red") and the second appearance feature (e.g., "color: orange") in the dissimilarity model based on the detection accuracy score of the first synthesized image (e.g., 40%). In some instances, such as where an appearance feature does not have an inherent quantitative value (e.g., a quantized length), the distinguishability processor 208 may determine a quantized level of similarity or dissimilarity between the values for use in further processing. For instance, red and orange may be assigned values that indicate that they are more similar than, for example red and green. The distinguishability processor 208 may also use the detection accuracy score of the first synthesized image (e.g., 40%) to adjust other dissimilarity metrics between the corresponding appearance features of the pen DEF and the pencil GHI that are associated with other feature types.

In block 512, the distinguishability processor 208 may adjust a discrimination weight of the feature type associated with the first appearance feature and the second appearance feature in the dissimilarity model based on the detection accuracy score of the synthesized image. In some embodiments, the discrimination weight of the feature type may indicate the level of importance of the feature type in determining the distinguishability of appearance between the item types. In the above example regarding the first synthesized image, the distinguishability processor 208 may adjust the discrimination weight of the feature type "color" based on the detection accuracy score of the first synthesized image (e.g., 40%). The distinguishability processor 208 may also use the detection accuracy score of the first synthesized image (e.g., 40%) to adjust the discrimination weights of other feature types in the dissimilarity model.

Thus, during the training stage 302, the dissimilarity model may learn the dissimilarity among various pairs of corresponding appearance features and the importance of various feature types in distinguishing the item types. This implementation is advantageous, because it can avoid relying on the subjective recognition and/or discrimination of the human agent with limited capacity to evaluate the appearance dissimilarity. Using the synthesized images that are automatically generated from various item images and clutter images to train the dissimilarity model may also be advantageous, in some embodiments, because the dissimilarity model can be comprehensively trained with a large number of training datasets corresponding to various combination of items positioned in various object arrangements.

In some embodiments, the distinguishability processor 208 may determine whether the dissimilarity model is sufficiently trained. For example, the distinguishability processor 208 may determine whether the values of one more model parameters of the dissimilarity model remain substantially unchanged in a predefined number of training cycles (e.g., in the last 5 training cycles). As discussed elsewhere herein, the model parameters of the dissimilarity model may include the dissimilarity metrics between the corresponding appearance features, the discrimination weight of the feature types, etc. In some embodiments, for a model parameter of the dissimilarity model, the distinguishability processor 208 may compute the difference between the values of the model parameter before and after adjustment in the predefined number of training cycles. The distinguishability processor 208 may determine that the difference between the values of the model parameter before and after adjustment satisfies a difference value threshold (e.g., less than 0.05), and thus determine that the values of these model parameters remain substantially unchanged in the predefined number of training cycles. As a result, the distinguishability processor 208 may determine that these model parameters of the dissimilarity model are sufficiently adjusted, and thus the dissimilarity model is ready for the deployment stage 304. It should be understood that other implementations may additionally or alternatively be used to determine whether the training process of the dissimilarity model has finished.

Figure 4:
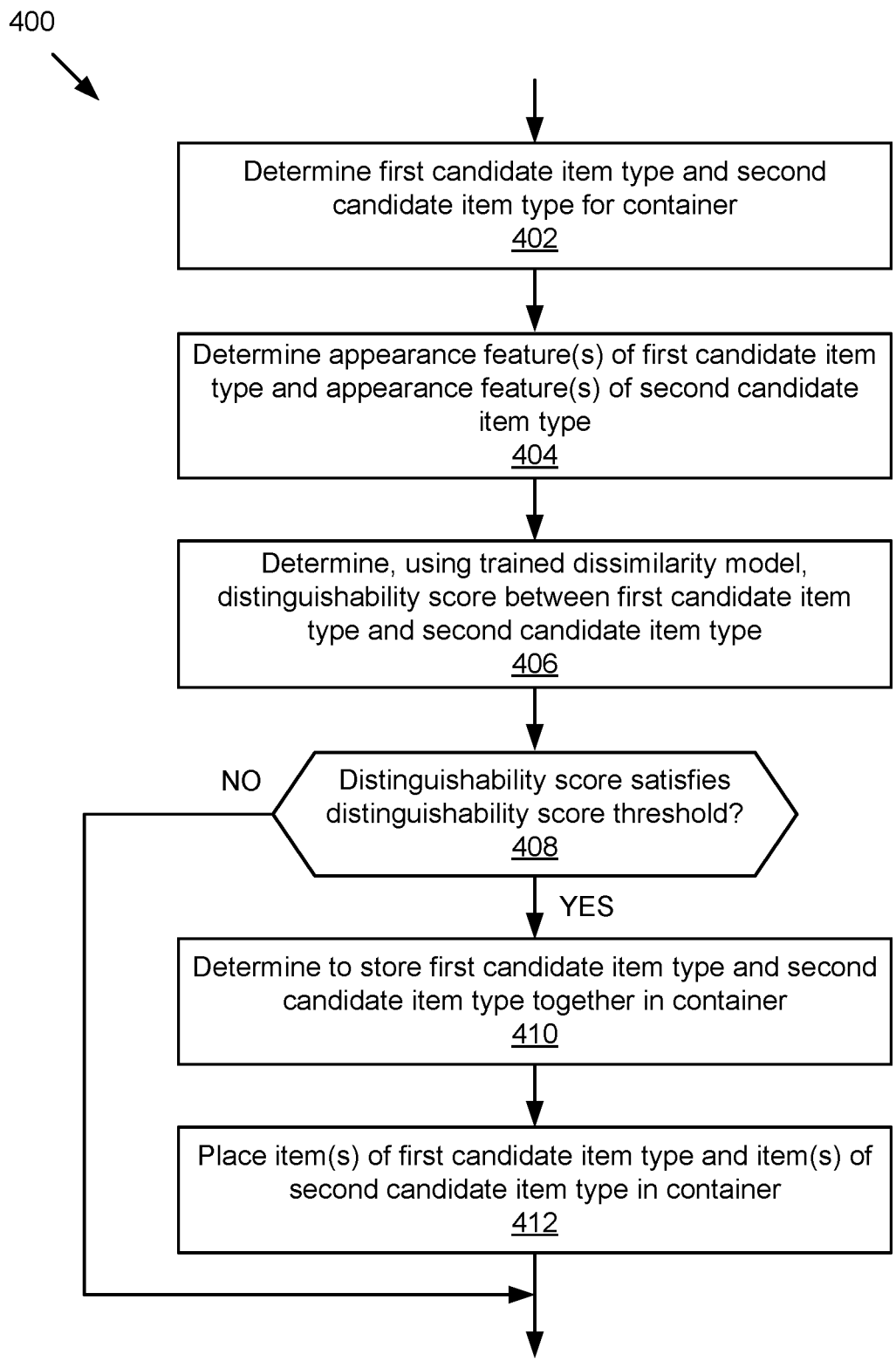
FIG. 4 is a flowchart of an example method for managing item types stored in the container.

As discussed elsewhere herein, in the deployment stage 304, the inventory management application 120 may apply the dissimilarity model to determine the item types that satisfy a threshold appearance dissimilarity to be stored in the same container. An example method 400 for determining the item types to be stored in the same container is illustrated in FIG. 4.

In block 402, the inventory management application 120 may determine a first candidate item type and a second candidate item type for a container. In some embodiments, the inventory management application 120 may determine one or more candidate item types 310 that can be stored together in the container based on the item affinities between these candidate item types 310, the sizes of the items (e.g., whether a threshold quantity of each item fit together in the container), the size of the container (e.g., whether the size allows both types of items to be stored in it), etc. In some embodiments, for a first item type and a second item type, the inventory management application 120 may determine the item affinity between the two item types based on the number of orders including both the first item type and the second item type. The item affinity between the first item type and the second item type may indicate a frequency of the two item types being co-present in the same order, and thus reflecting the demand correlation between the two item types. As an example, assuming that among 300 customer orders, there are 75 customer orders including both an item of a first item type and an item of a second item type. In this example, the inventory management application 120 may determine the item affinity between the first item type and the second item type to be 0.25. In another example, assuming that among 450 customer orders including the first item type, there are 90 customer orders also including the second item type. In this example, the inventory management application 120 may determine the item affinity between the first item type and the second item type to be 0.2.

In some embodiments, the inventory management application 120 may compute the item affinity for various pairs of item types in the storage facility, and determine the candidate item types 310 for the container from these item types based on the item affinities. In some embodiments, the inventory management application 120 may determine that the first item type and the second item type have an affinity between the first item type and the second item type satisfying an item affinity threshold (e.g., higher than 0.75), and, based on this factor, determine the first item type and the second item type to be candidate item types 310 for the container. In some embodiments, the inventory management application 120 may determine a group of item types that has an item affinity between any pair of item types in the group satisfying the item affinity threshold, and determine the item types in the group to be the candidate item types 310 for the container. Other implementations for determining the candidate item types 310 for the container are also possible and contemplated.

In some embodiments, for a pair of candidate item types 310 including a first candidate item type and a second candidate item type, the inventory management application 120 may evaluate the appearance distinguishability between the first candidate item type and the second candidate item type using the dissimilarity model, and determine whether to store the first candidate item type and the second candidate item type together in the same container based on the appearance distinguishability.

In block 404, the appearance feature extractor 202 may determine one or more appearance features of the first candidate item type and one or more appearance features of the second candidate item type. As discussed elsewhere herein, the appearance feature extractor 202 may analyze the item images of the first candidate item type to determine the appearance features of the first candidate item type, and analyze the item images of the second candidate item type to determine the appearance features of the second candidate item type. Alternatively, the appearance feature extractor 202 may retrieve the appearance features of the first candidate item type and the appearance features of the second candidate item type from the data store 136. As discussed elsewhere herein, the appearance features of the first candidate item type may be associated with various feature types (e.g., color, geometric shape, dimension, packaging material, etc.) and may describe various appearance aspects of the first candidate item type. Similarly, the appearance features of the second candidate item type may be associated with various feature types and may describe various appearance aspects of the second candidate item type.

In block 406, the distinguishability processor 208 may determine a distinguishability score between the first candidate item type and the second candidate item type. The distinguishability score may indicate the appearance distinguishability between the first candidate item type and the second candidate item type, and may be determined based on the appearance features of the first candidate item type and the appearance features of the second candidate item type using the trained dissimilarity model. In some embodiments, for each feature type, the distinguishability processor 208 may determine the dissimilarity metric between the corresponding appearance features of the first candidate item type and the second candidate item type for the feature type in the dissimilarity model. The distinguishability processor 208 may also determine the discrimination weight of the feature type in the dissimilarity model. The distinguishability processor 208 may then determine the distinguishability score between the first candidate item type and the second candidate item type based on these values. For example, the distinguishability score between the first candidate item type and the second candidate item type may be the total value of weighted dissimilarity metrics between the corresponding appearance features of these two candidate item types for various feature types.

As an example, the distinguishability processor 208 may determine a distinguishability score between the first candidate item type "pen DEF" and the second candidate item type "pencil GHI." In this example, the appearance feature extractor 202 may determine that the appearance features of the pen DEF are "color: red," "geometric shape: rectangle," and "dimension: length=15 cm, width=7 cm, height=3 cm." The appearance feature extractor 202 may also determine that the appearance features of the pencil GHI are "color: orange," "geometric shape: rectangle," and "dimension: length=12 cm, width=9 cm, height=3 cm." In this example, the distinguishability processor 208 may use the trained dissimilarity model and determine that for the feature type "color," the dissimilarity metric between the appearance feature "color: red" and the appearance feature "color: orange" is 0.2 and the discrimination weight of the feature type "color" is 0.5. For instance, for the feature type "geometric shape," the distinguishability processor 208 may determine that the dissimilarity metric between the appearance feature "geometric shape: rectangle" and the appearance feature "geometric shape: rectangle" is 0 and the discrimination weight of the feature type "geometric shape" is 0.35. For the feature type "dimension," the distinguishability processor 208 may determine that the dissimilarity metric between the appearance feature "dimension: length=15 cm, width=7 cm, height=3 cm" and the appearance feature "dimension: length=12 cm, width=9 cm, height=3 cm" is 0.15 and the discrimination weight of the feature type "geometric shape" is 0.15, although these values are provided only as examples and may vary depending on the specific computation, weighting, etc., used. Thus, the distinguishability processor 208 may determine the distinguishability score between the first candidate item type "pen DEF" and the second candidate item type "pencil GHI" to be (0.2*0.5+0*0.35+0.15*0.15)=0.1225.

In block 408, the distinguishability processor 208 may determine whether the distinguishability score between the first candidate item type and the second candidate item type satisfies a distinguishability score threshold (e.g., higher than 0.5). If in block 408, the distinguishability processor 208 determines that the distinguishability score between the first candidate item type and the second candidate item type satisfies the distinguishability score threshold, the distinguishability processor 208 may determine that the first candidate item type and the second candidate item type satisfy the threshold appearance dissimilarity, and thus can be distinguished from one another without requiring significant effort from the human agent or processor cycles by a computing device.

The method 400 may then proceed to block 410, at which the distinguishability processor 208 may determine to store the first candidate item type and the second candidate item type together in the same container. In some embodiments, the distinguishability processor 208 may update the set of distinguishable item types to include the first candidate item type and the second candidate item type. As discussed elsewhere herein, the set of distinguishable item types may include the candidate item types 310 that satisfy the threshold appearance dissimilarity, and thus can be easily distinguished from one another by the human agent.

If, in block 408, the distinguishability processor 208 determines that the distinguishability score between the first candidate item type and the second candidate item type does not satisfy the distinguishability score threshold, the distinguishability processor 208 may determine that the first candidate item type and the second candidate item type do not satisfy the threshold appearance dissimilarity, and thus may not be distinguished from one another without requiring more complicated recognition and discrimination consideration. Therefore, the distinguishability processor 208 may determine not to store the first candidate item type and the second candidate item type together in the same container. In some embodiments, the distinguishability processor 208 may exclude the first candidate item type and the second candidate item type from the set of distinguishable item types that may be stored together.

In some embodiments, the distinguishability processor 208 may transmit the set of distinguishable item types to the robotic device 107 and/or other automated sorting mechanisms, and instruct the robotic device 107 and/or other automated sorting mechanisms to place the items of one or more item types in the set of distinguishable item types into the same container or partition thereof. Alternatively, the distinguishability processor 208 may transmit the set of distinguishable item types to the user device 109, and the user device 109 may display the set of distinguishable item types to the user 111 of the user device 109. The user 111 (e.g., a human agent) may reference the set of distinguishable item types displayed on the user device 109, and place the items of one or more item types in the set of distinguishable item types into the same container. For example, the set of distinguishable item types may include the first candidate item type and the second candidate item type. The robotic device 107, the automated sorting mechanism, and/or the user 111 may place one or more items of the first candidate item type and one or more items of the second candidate item type into the same container.

In some embodiments, the robotic device 107, automated sorting mechanism, and/or user 111 may place the items of the distinguishable item types into the same container without separately placing the items belonging to different item types in different areas of the container or in different compartments of the container. In some embodiments, the container divider(s) that divide the container into multiple compartments may be excluded thereby decreasing wasted space. Thus, the container may include one compartment, and the robotic device 107, the automated sorting mechanism, and/or user 111 may place multiple items belonging to various item types together in the single compartment of the container. In some instances, an items having a first and second candidate item type may be placed in a first compartment of a multi-compartment container and items having a third candidate item type may be placed in a second compartment of the container.

These implementations may be advantageous because the number of item types stored in the container may not be limited by the number of compartments of the container. As a result, the container may store a larger number of item types, based on the item types stored in the container satisfying the threshold appearance dissimilarity between one another, so as to not confuse the item recognition during picking an item a particular item type from the container. Therefore, in some instances, the container may be used to fulfill multiple orders when the container is retrieved and transported to the picking station. These implementations may also decrease the need to retrieve and transport different containers from different storage locations to the picking station to fulfill the orders, for instance, in case the container stores multiple item types that are dissimilar in appearance, have a relatively low item velocity, and/or have a high affinity. As discussed elsewhere herein, the item velocity of an item type may indicate the number of orders that request the item type in a time period (e.g., 480 orders/70 days), and thus reflecting the customer demand of the item type.

These implementations may also be advantageous because they may decrease the number of compartments in the container to 1, thereby avoiding the unutilized storage space in multiple separate compartments and optimizing the utilization of the entire storage space of the container. In addition, because the items of various item types may be stored in the container together as a mixture of objects, the balance of the container can be improved and the stability of the container during transportation can be increased. As discussed elsewhere herein, only the item types that satisfy the threshold appearance dissimilarity between one another may be stored together in the same container. Thus, even if these item types are stored in the container without being organized and/or being separated by the container dividers, the cognitive workload for the human agent or processing workload of a computing device (e.g., a robotic device 107) to recognize and correctly pick the items of the requested item type from the container may be reduced.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input and/or output devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    determining, by a computer, a first candidate item type and a second candidate item type;
    determining one or more appearance features of the first candidate item type and one or more appearance features of the second candidate item type;
    determining, using a dissimilarity model, a distinguishability score between the first candidate item type and the second candidate item type based on the one or more appearance features of the first candidate item type and the one or more appearance features of the second candidate item type;
    determining to store the first candidate item type and the second candidate item type together in a container based on the distinguishability score between the first candidate item type and the second candidate item type; and
    placing one or more items of the first candidate item type and one or more items of the second candidate item type in the container.

2. The method of claim 1, wherein placing the one or more items of the first candidate item type and the one or more items of the second candidate item type in the container includes:
    placing the one or more items of the first candidate item type and the one or more items of the second candidate item type in a same compartment of the container.

3. The method of claim 1, wherein determining the first candidate item type and the second candidate item type for the container includes:
    determining an item affinity between the first candidate item type and the second candidate item type based on a number of orders including the first candidate item type and the second candidate item type; and
    determining that the item affinity between the first candidate item type and the second candidate item type satisfies an item affinity threshold.

4. The method of claim 1, further comprising:
    training the dissimilarity model using one or more item images of a first item type and one or more item images of a second item type.

5. The method of claim 4, wherein training the dissimilarity model includes:
    generating a synthesized image using the one or more item images of the first item type and the one or more item images of the second item type;
    detecting, using an object detection model, one or more items in the synthesized image;
    computing a detection accuracy score associated with the synthesized image;
    determining a first appearance feature associated with a feature type of the first item type and a second appearance feature associated with the feature type of the second item type; and
    adjusting one or more parameters of the dissimilarity model based on the first appearance feature of the first item type, the second appearance feature of the second item type, and the detection accuracy score associated with the synthesized image.

6. The method of claim 5, wherein:
    the first appearance feature of the first item type specifying the feature type and a value of the feature type associated with the first item type; and
    the feature type includes one or more of a color, a geometric shape, a dimension, and a packaging material.

7. The method of claim 5, wherein adjusting the one or more parameters of the dissimilarity model includes:
    adjusting a dissimilarity metric between the first appearance feature and the second appearance feature in the dissimilarity model based on the detection accuracy score associated with the synthesized image; and
    adjusting a discrimination weight of the feature type associated with the first appearance feature and the second appearance feature in the dissimilarity model based on the detection accuracy score associated with the synthesized image.

8. The method of claim 5, wherein generating the synthesized image includes:
    retrieving a clutter image depicting a clutter structure; and
    generating the synthesized image using the one or more item images of the first item type, the one or more item images of the second item type, and the clutter image, the synthesized image depicting one or more items of the first item type and one or more items of the second item type positioned based on the clutter structure.

9. The method of claim 5, wherein computing the detection accuracy score associated with the synthesized image includes:
    determining a target detection result associated with the synthesized image; and
    computing the detection accuracy score associated with the synthesized image based on a detection result of the synthesized image generated by the object detection model and the target detection result of the synthesized image.

10. The method of claim 5, wherein:
    the object detection model has an algorithm complexity metric satisfying an algorithm complexity metric threshold.

11. A system comprising:
    one or more processors; and
    one or more memories storing instructions that, when executed by the one or more processors, cause the system to:
        determine a first candidate item type and a second candidate item type for a container;
        determine one or more appearance features of the first candidate item type and one or more appearance features of the second candidate item type;
        determine, using a dissimilarity model, a distinguishability score between the first candidate item type and the second candidate item type based on the one or more appearance features of the first candidate item type and the one or more appearance features of the second candidate item type;
        determine to store the first candidate item type and the second candidate item type together in the container based on the distinguishability score between the first candidate item type and the second candidate item type; and
        place one or more items of the first candidate item type and one or more items of the second candidate item type in the container.

12. The system of claim 11, wherein placing the one or more items of the first candidate item type and the one or more items of the second candidate item type in the container includes:
    placing the one or more items of the first candidate item type and the one or more items of the second candidate item type in a first compartment of the container, wherein the container includes two or more compartments, and an item having a third item type that is different from the first candidate item type and from the second candidate item type is assigned to and placed in a second compartment of the two or more compartments.

13. The system of claim 11, wherein determining the first candidate item type and the second candidate item type for the container includes:
determining an item affinity between the first candidate item type and the second candidate item type based on a number of orders including the first candidate item type and the second candidate item type; and
determining that the item affinity between the first candidate item type and the second candidate item type satisfies an item affinity threshold.

14. The system of claim 11, wherein the instructions, when executed by the one or more processors, further cause the system to:
train the dissimilarity model using one or more item images of a first item type and one or more item images of a second item type.

15. The system of claim 14, wherein training the dissimilarity model includes:
generating a synthesized image using the one or more item images of the first item type and the one or more item images of the second item type;
detecting, using an object detection model, one or more items in the synthesized image;
computing a detection accuracy score associated with the synthesized image;
determining a first appearance feature associated with a feature type of the first item type and a second appearance feature associated with the feature type of the second item type; and
adjusting one or more parameters of the dissimilarity model based on the first appearance feature of the first item type, the second appearance feature of the second item type, and the detection accuracy score associated with the synthesized image.

16. The system of claim 15, wherein:
the first appearance feature of the first item type specifying the feature type and a value of the feature type associated with the first item type; and
the feature type includes one or more of a color, a geometric shape, a dimension, and a packaging material.

17. The system of claim 15, wherein adjusting the one or more parameters of the dissimilarity model includes:
adjusting a dissimilarity metric between the first appearance feature and the second appearance feature in the dissimilarity model based on the detection accuracy score associated with the synthesized image; and
adjusting a discrimination weight of the feature type associated with the first appearance feature and the second appearance feature in the dissimilarity model based on the detection accuracy score associated with the synthesized image.

18. The system of claim 15, wherein generating the synthesized image includes:
retrieving a clutter image depicting a clutter structure; and
generating the synthesized image using the one or more item images of the first item type, the one or more item images of the second item type, and the clutter image, the synthesized image depicting one or more items of the first item type and one or more items of the second item type positioned based on the clutter structure.

19. The system of claim 15, wherein:
computing the detection accuracy score associated with the synthesized image includes:
determining a target detection result associated with the synthesized image; and
computing the detection accuracy score associated with the synthesized image based on a detection result of the synthesized image generated by the object detection model and the target detection result of the synthesized image; and
the object detection model has an algorithm complexity metric satisfying an algorithm complexity metric threshold.

20. A method comprising:
training a dissimilarity model using one or more item images of a plurality of item types;
determining, from the plurality of item types, a first candidate item type and a second candidate item type;
determining one or more appearance features of the first candidate item type and one or more appearance features of the second candidate item type;
determining, using the trained dissimilarity model, a distinguishability score between the first candidate item type and the second candidate item type based on the one or more appearance features of the first candidate item type and the one or more appearance features of the second candidate item type;
determining to store the first candidate item type and the second candidate item type together in a container based on the distinguishability score between the first candidate item type and the second candidate item type; and
instructing a robotic device to place one or more items of the first candidate item type and one or more items of the second candidate item type in the container.

* * * * *